March 24, 1942.  E. H. MUNSINGER  2,277,448
TITLING DEVICE
Filed July 15, 1940
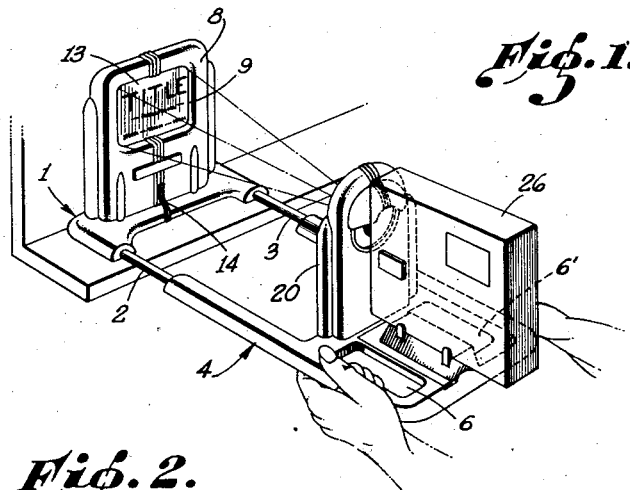
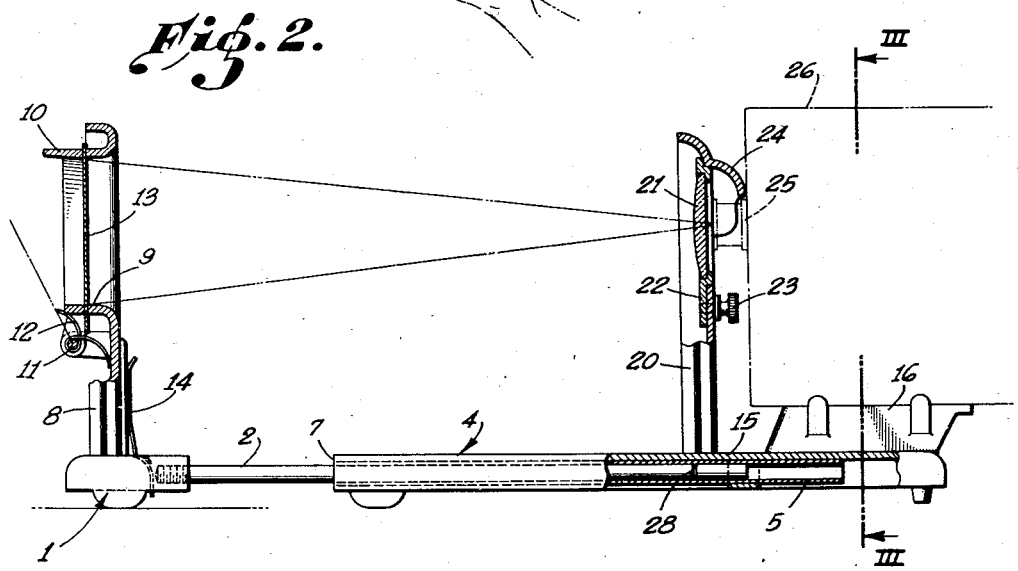
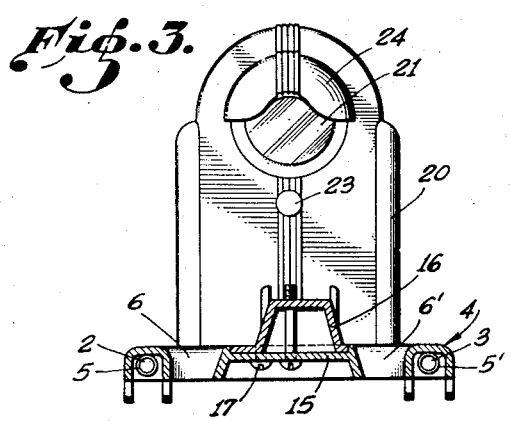
ERICH H. MUNSINGER
INVENTOR
BY
ATTORNEY Patented Mar. 24, 1942

2,277,448

UNITED STATES PATENT OFFICE 2,277,448

TITLING DEVICE

Erich H. Munsinger, Los Angeles, Calif., assignor to John E. Pratt, Los Angeles, Calif.

Application July 15, 1940, Serial No. 345,485

6 Claims. (Cl. 88—24)

The present invention pertains to a compact portable device for use with amateur motion picture cameras such as the well known 8 millimeter and 16 millimeter cameras now on the market. The device of this invention is particularly adapted for use in making titles for motion picture film taken in such amateur cameras, for close-up work such as the flower and small object study, for use in obtaining sharp focus portraits or photographic copywork at focal distances much shorter than those permitted with the normal lens equipment of a camera, and includes means whereby a receding or progressively enlarging motion picture photographic record of a title, object, or the like, may be readily attained.

By the term "amateur motion picture camera," reference will be had to the small portable devices employing 8 and 16 millimeter film which are ordinarily held in the hand when used.

Heretofore, the owner of an amateur motion picture camera had no means at his disposal whereby suitable titles could be introduced into the film for the purpose of identifying the subject matter depicted on his film, since existing devices were flimsy, vibrated extensively and caused diffused images to be formed. The titling of this miniature film was in the hands of a few professionals who had complicated and bulky equipment available for this purpose.

The present invention is directed toward an inexpensive portable device capable of being employed with the various models and types of amateur motion picture cameras whereby the amateur may increase the scope of usefulness of his camera and personally make titles and close-ups in a professional manner without any difficulty.

An object of the present invention, therefore, is to provide a simple, efficient, light weight, portable titling device for use with amateur motion picture cameras.

Another object is to provide a portable, light weight device provided with interchangeable elements readily adapting the device for use with various types, styles and sizes of amateur motion picture cameras.

These and other objects, uses and advantages of the invention will become apparent to those skilled in the art to which this invention pertains from the following description. In describing the invention, reference will be had to the appended drawing, in which:

Fig. 1 is a perspective view of the device in actual use.

Fig. 2 is a side view, partly broken away.

Fig. 3 is a transverse section taken along the plane III—III of Fig. 2.

The illustrative form of device shown in the drawing may comprise a toe member 1 provided with a pair of spaced parallel guide rods 2 and 3 slidably received within parallel guides carried by a frame, generally indicated at 4. As shown in Fig. 2, the guides may comprise tubes 5 in parallel relation with the frame 4. The frame 4 is preferably of light weight casting. Hand grip apertures, such as the apertures 6, are preferably provided in the frame 4 so as to facilitate manipulation of the device during operation. As shown in the drawing, the frame 4 may include two substantially hollow arms containing the tubes 5 and 5', the ends of these arms, indicated at 7, being adapted to abut the toe member 1 when the device is in collapsed position.

The toe member 1 preferably carries a card holder indicated at 8, said card holder being provided with an aperture 9. A clamp, in the form of a frame 10, pivoted as at 11 and provided with a spring 12, is carried by the card holder 8. This frame 10 is used in holding suitable cards or objects 13 on the card holder so that said object or card 13 is positively held within the aperture 9 during the photographic operation. If desired, an auxiliary spring 14 may be carried by the bottom of the toe member 1, such spring being available to hold a larger object or card against the front surface of the card holder 8.

The frame 4 is provided with a base plate 15 adapted to receive any one of a number of mounting blocks, such as the mounting block 16. The mounting block 16 is firmly held in position on the base plate 15 by means of a machine screw 17. Each of the mounting plates 16 is designed to snugly receive and hold a given type of amateur motion picture camera.

By having a number of mounting plates of different forms, sizes and heights, various types of amateur motion picture cameras may be firmly held on the device in proper relationship to the card holder 8 and a lens holder 20. The lens holder 20 is carried by the frame 4 between the mounting block and the toe member 1 and includes a lens 21 in a frame 22, means being provided for removably attaching the lens and its frame to the lens holder 20. Such means are indicated at 23.

The lens holder may also have a hood 24 partially encircling the camera lens 25 of a camera 26 mounted upon the mounting block 16. The hood 24 protects the camera lens 25 from exposure to unnecessary light and prevents reflections on the surface of the lens 21.

As shown in Figs. 1 and 2, the amateur motion picture camera 26, when mounted upon the mounting block 16, permits the lens 25 of the camera to be in close juxtaposition to the surface of the lens 21. The lens 21 permits the focal length of the camera lens 25 to be shortened so that sharp focus is obtained upon the card or other object held by the card holder 8.

In a form of device which has been successfully used, the distance between the lens 21 and the plane of the card holder 8 (when the device is in collapsed form) is about 8 inches so that the lens 21 has an 8 inch focal length and the camera lens 25 is focused upon the card 13 in the card holder when the device is in collapsed position. In order to obtain what is professionally termed a "zoom" title, wherein a rather large and indefinite field is gradually converted into a sharp close-up of but a portion of such field, the device is extended, the toe member 1 being moved away from the frame 4. It will be noticed in Fig. 2 that the guide rod 2 is provided with an indentation mark or other indicating means at 28, such mark being spaced from the end of the rod 2 within the guide 5.

When the toe member 1 is extended so that the index 28 is in line with the end 7 of the frame 4, the focal distance may be any desired predetermined distance period. In the form of apparatus which has been used and to which reference has been made heretofore, the total distance is 16 inches when the device is in such extended form. A suitable card title or the like may then be placed into the card holder 8 and the toe member 1 placed against a suitable rest, as indicated in Fig. 1. The card is then illuminated in any desired manner, the motion picture camera 26 started and the operator, by grasping the frame through the hand grip apertures 6 and 6', can gradually and slowly move the frame 4 towards the toe member 1 along the guide rods 2 and 3. After the device has reached a completely collapsed position, the operator permits the camera to operate for a brief period of time and then stops it. In this manner, he obtains what is termed a "zoom" title shot in which the words written on the title card are first extremely small and indistinct and then appear to enlarge and come into sharp focus. Such an effect is occasionally referred to as a "fade in." By reversing the operations, a "fade out" may be obtained.

Those skilled in the art will appreciate that numerous changes may be made and that the device herein described is adapted to a large number of uses. Flowers and very small objects may be positioned within the card holder and photographed effectively. Many artistic effects can be obtained in a professional manner with this device.

All changes and modifications coming within the scope of the appended claims are embraced thereby.

I claim:

1. A titling device for use with amateur motion picture cameras, comprising: a toe member provided with a pair of spaced parallel rods extending therefrom, a card holder carried by the toe member in a plane at right angles to the plane of said rods; a frame provided with a pair of rigid parallel guides adapted to slidably receive said rods; a mounting block removably attached to one end of said frame and adapted to hold a camera in position; and a lens holder carried by said frame between said mounting block and said toe member, said lens holder including a lens removably attached to said holder and adapted to focus a camera on said mounting block onto the card holder.

2. A titling device for use with amateur motion picture cameras, comprising: a toe member provided with a pair of spaced parallel rods extending therefrom, a card holder carried by the toe member in a plane at right angles to the plane of said rods; a rigid frame provided with a pair of integral parallel guides adapted to slidably receive said rods; a mounting block removably attached to one end of said frame and adapted to hold a camera in position; hand grip apertures formed in said frame adjacent said mounting block; and a lens holder carried by said frame between said mounting block and said toe member, said lens holder including a lens removably attached to said holder and adapted to focus a camera on said mounting block onto the card holder.

3. A titling device for use with amateur motion picture cameras, comprising: a toe member provided with a pair of spaced parallel rods extending therefrom, a card holder carried by the toe member in a plane at right angles to the plane of said rods; a spring-actuated clamping means for holding a card in position on said card holder; a rigid frame provided with a pair of integral parallel guides adapted to slidably receive said rods; a mounting block removably attached to one end of said frame and adapted to hold a camera in position; hand grip apertures formed in said frame adjacent said mounting block, and a lens holder carried by said frame between said mounting block and said toe member, said lens holder including a lens removably attached to said holder and adapted to focus a camera on said mounting block onto the card holder.

4. A titling device for use with amateur motion picture cameras, comprising: a toe member provided with a pair of spaced parallel rods extending therefrom, a card holder carried by the toe member in a plane at right angles to the plane of said rods; a spring-actuated clamping means for holding a card in position on said card holder; a cast, rigid frame provided with a pair of integral parallel guides adapted to slidably receive said rods; a mounting block removably attached to one end of said frame and adapted to hold a camera in position; hand grip apertures formed in said frame adjacent said mounting block, and a lens holder carried by said frame between said mounting block and said toe member, said lens holder including a lens removably attached to said holder and adapted to focus a camera on said mounting block onto the card holder, and a hood carried by said lens holder around said lens.

5. A titling device for use with amateur motion picture cameras, comprising: a toe member provided with a pair of spaced parallel rods extending therefrom, distance-indicating means carried by said guide rods, a card holder carried by the toe member in a plane at right angles to the plane of said rods; a spring-actuated clamping means for holding a card in position on said card holder; a rigid, cast frame provided with a pair of integral parallel guides adapted to slidably receive said rods; a mounting block removably attached to one end of said frame and adapted to hold a camera in position; and a lens holder carried by said frame between said mounting block and said toe member, said lens holder including a lens removably attached to said holder and adapted to focus a camera on said mounting block onto the card holder.

6. A titling device for use with amateur motion picture cameras, comprising: a toe member provided with a pair of spaced parallel rods extending therefrom; distance-indicating means carried by said guide rods; a card holder carried by the toe member in a plane at right angles to the plane of said rods; a frame provided with a pair of integral parallel guides adapted to slidably receive said rods; a mounting block removably attached to one end of said frame and adapted to hold a camera in position; hand grip apertures formed in said frame adjacent said mounting block; and a lens holder carried by said frame between said mounting block and said toe member, said lens holder including a lens removably attached to said holder and adapted to focus a camera on said mounting block onto the card holder, and a hood carried by said lens holder around said lens.

ERICH H. MUNSINGER.